(12) United States Patent
Todd

(10) Patent No.: US 12,423,402 B2
(45) Date of Patent: Sep. 23, 2025

(54) TECHNIQUES FOR CREDENTIAL AND IDENTITY SYNCHRONIZATION

(71) Applicant: Okta, Inc., San Francisco, CA (US)

(72) Inventor: Jonathan Roman Todd, Boulder, CO (US)

( * ) Notice: Subject to any disclaimer, the term of this patent is extended or adjusted under 35 U.S.C. 154(b) by 320 days.

(21) Appl. No.: 17/814,315

(22) Filed: Jul. 22, 2022

(65) Prior Publication Data

US 2023/0351004 A1    Nov. 2, 2023

Related U.S. Application Data

(60) Provisional application No. 63/363,909, filed on Apr. 29, 2022.

(51) Int. Cl.
| | | |
|---|---|---|
| *G06F 21/44* | (2013.01) | |
| *H04L 9/40* | (2022.01) | |
| *H04W 12/06* | (2021.01) | |

(52) U.S. Cl.
CPC ............ *G06F 21/44* (2013.01); *H04L 63/08* (2013.01); *H04W 12/068* (2021.01)

(58) Field of Classification Search
CPC ......... G06F 21/44; G06F 21/45; H04L 63/08; H04W 12/068
See application file for complete search history.

(56) References Cited

U.S. PATENT DOCUMENTS

| | | | |
|---|---|---|---|
| 9,424,419 B1 * | 8/2016 | Kruse ................... | G06F 21/31 |
| 9,558,341 B1 * | 1/2017 | Allababidi ............. | G06F 21/45 |
| 10,475,273 B2 * | 11/2019 | Campero ............... | G06F 16/27 |
| 10,825,001 B2 * | 11/2020 | Purves ................. | G06Q 20/227 |
| 11,183,294 B2 * | 11/2021 | Sargent ................ | G06V 10/82 |

(Continued)

FOREIGN PATENT DOCUMENTS

WO    WO-2014210227 A1 *    12/2014    .......... G06Q 20/363

OTHER PUBLICATIONS

AlSharqawi et al.; "Challenges on Identity Management Iot Environment—Survey", 2020, International Conference on Computing and Information Technology, vol. 02, Issue: ICCIT—1441, pp. 123-127. (Year: 2020).*

(Continued)

*Primary Examiner* — Matthew Smithers
(74) *Attorney, Agent, or Firm* — Holland & Hart LLP

(57) ABSTRACT

Methods, systems, and devices for managing identifying information are described. A software platform (e.g., a wallet) may access an application to update a credential based on an integration parameter for the software platform, which may correspond to how the software platform may access the application. For example, the software platform may receive a request (e.g., from a user) to update the credential. The software platform may identify an association between the software platform and the application. Based on the association between the software platform and the application, the software platform may determine an integration parameter available to the software platform for communicating with the application. The software platform may access the application based on the integration parameter, for example using authentication information stored at the software platform, and update the credential associated with the application.

20 Claims, 6 Drawing Sheets

(56) References Cited

U.S. PATENT DOCUMENTS

| | | | |
|---|---|---|---|
| 11,258,875 B2* | 2/2022 | Kouru | H04L 67/06 |
| 11,438,764 B2* | 9/2022 | Avetisov | H04W 12/069 |
| 11,836,241 B1* | 12/2023 | Unnikrishnan | G06F 21/41 |
| 2002/0027713 A1* | 3/2002 | Turnbull | B60R 1/088 |
| | | | 359/604 |
| 2005/0027713 A1* | 2/2005 | Cameron | H04L 63/083 |
| 2007/0130463 A1* | 6/2007 | Law | G06F 21/34 |
| | | | 713/168 |
| 2008/0126145 A1* | 5/2008 | Rackley, III | G06Q 20/102 |
| | | | 455/406 |
| 2010/0095372 A1* | 4/2010 | Hodgkinson | G06F 21/41 |
| | | | 726/19 |
| 2011/0093937 A1* | 4/2011 | Mantle | G06F 21/44 |
| | | | 726/6 |
| 2013/0086658 A1* | 4/2013 | Kottahachchi | H04L 63/10 |
| | | | 726/6 |
| 2013/0086669 A1* | 4/2013 | Sondhi | H04W 12/068 |
| | | | 726/8 |
| 2014/0250006 A1* | 9/2014 | Makhotin | G06Q 20/326 |
| | | | 705/41 |
| 2015/0286816 A1* | 10/2015 | Adler | H04L 63/083 |
| | | | 726/6 |
| 2017/0011214 A1* | 1/2017 | Cavanagh | H04L 63/0846 |
| 2017/0061427 A1* | 3/2017 | Sharma | G06Q 20/367 |
| 2017/0200151 A1* | 7/2017 | Bruno | H04W 12/068 |
| 2018/0108008 A1* | 4/2018 | Chumbley | G06Q 20/3674 |
| 2018/0176195 A1* | 6/2018 | Pangam | G06F 21/45 |
| 2019/0019179 A1* | 1/2019 | Mtaza | G06Q 20/4016 |
| 2019/0028447 A9* | 1/2019 | Pangam | H04L 63/083 |
| 2019/0050557 A1* | 2/2019 | Martin | H04L 63/08 |
| 2020/0265417 A1* | 8/2020 | Bruno | G06Q 20/363 |
| 2021/0194884 A1* | 6/2021 | Xie | G06N 20/00 |
| 2021/0209205 A1* | 7/2021 | Baldwin | G06F 21/604 |
| 2021/0377252 A1* | 12/2021 | Monro | H04L 63/0884 |
| 2022/0070000 A1* | 3/2022 | Gondza | H04L 63/123 |
| 2023/0015523 A1* | 1/2023 | Mani | G06Q 20/383 |
| 2023/0179590 A1* | 6/2023 | Kim | H04L 9/3247 |
| | | | 726/6 |

OTHER PUBLICATIONS

Buecker et al.; "Integrated Identity and Access Management Architectural Patterns", 2008, IBM.com/redbooks, pp. 1-44. (Year: 2008).*

Buecker et al.; "Integrated Identity and Access Management Architectural Patterns" 2008, IBM Redbooks, pp. 1-44. (Year: 2008).*

* cited by examiner

TECHNIQUES FOR CREDENTIAL AND IDENTITY SYNCHRONIZATION

CROSS REFERENCE

The present application for patent claims the benefit of U.S. Provisional Patent Application No. 63/363,909 by TODD, entitled "TECHNIQUES FOR CREDENTIAL AND IDENTITY SYNCHRONIZATION," filed Apr. 29, 2022, assigned to the assignee hereof, and expressly incorporated by reference herein.

FIELD OF TECHNOLOGY

The present disclosure relates generally to managing identifying information, and more specifically to techniques for credential and identity synchronization.

BACKGROUND

A software application may request a user to log into an account using authentication information, such as a combination of a username and a password. Users who have accounts for several different applications must therefore remember several different usernames and passwords. Additionally, or alternatively, the necessity of separately logging in to each application may impose considerable burden on a user, who must enter usernames and passwords for each application used.

In some cases, a user may use a software platform to help manage contacts or other identifying information associated with accounts for accessing software applications. However, for some use cases, conventional information management techniques may be deficient or sub-optimal in some current configurations.

DETAILED DESCRIPTION

Figure 1:
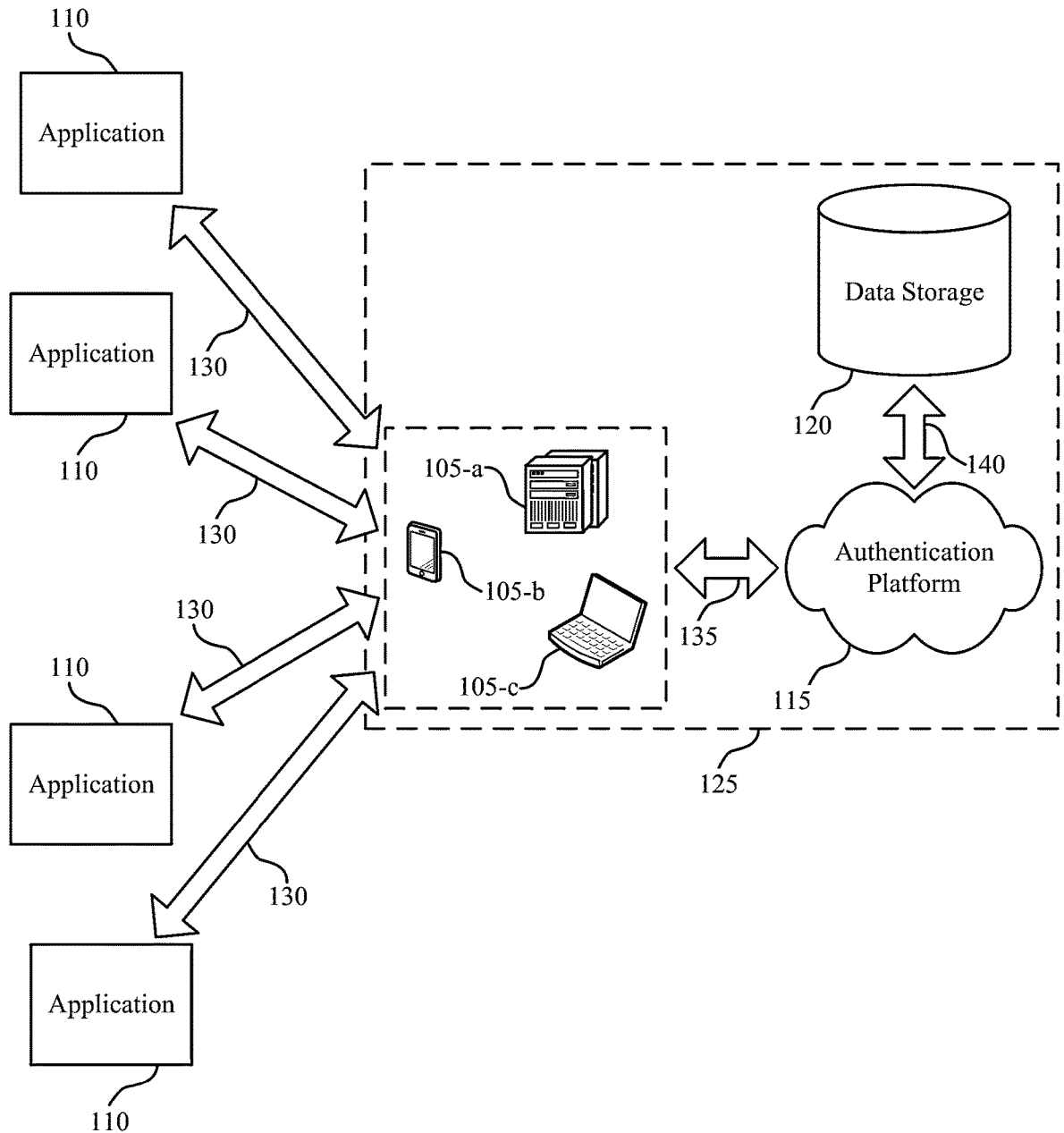
FIG. 1 illustrates an example of a system that supports techniques for credential and identity synchronization in accordance with aspects of the present disclosure.

A user may use a software platform (which, for example, may be referred to as a "wallet" or a "password manager") to manage identifying information associated with the user. The identifying information may include personal information (e.g., name, social security number, driver license number), contact information (e.g., home address, telephone number, email address), payment information (e.g., credit card number, bank information), account information (e.g., usernames, passwords), or any combination thereof. In some examples, the software platform may be stored locally at a device of the user. Additionally, or alternatively, the software platform may be implemented as a cloud platform, and the user may access the software platform via a cloud client. In some cases, a user may wish to update identifying information associated with an application (e.g., an Internet site), such as a credential for logging the user into the application, where the credential may be stored at the software platform. It may be beneficial to configure the software platform to perform the update using the identifying information stored at the software platform.

The techniques described herein may enable a software platform to access an application to update a credential based on an integration parameter for the software platform, which may correspond to how the software platform may access the application. For example, the software platform may receive a request to update the credential. The software platform may identify an association between the software platform and the application. For example, the software platform may have a customer identity and access management (CIAM) relationship with the application, where the application may allow the software platform (or a related entity, such as a software as a service (SaaS) platform) to manage login verification or other authentication procedures for the application. Additionally, or alternatively, the application may include a software development kit (SDK) or an application programming interface (API) of the software platform, which may provide access to a backend of the application for managing the credential. Based on the association between the software platform and the application, the software platform may determine an integration parameter available to the software platform for communicating with the application. The software platform may access the application based on the integration parameter, for example using authentication information stored at the software platform, and update the credential associated with the application. In some examples, the software platform may use respective integration parameters associated with a set of applications to concurrently update credentials associated with the set of applications. For example, if a user has accounts across a relatively large quantity of applications, the software platform may enable the user to efficiently update credentials (e.g., passwords) at the applications, for example, without the user separately accessing each application.

In some examples, the software platform may enable additional security procedures at the application. For example, the software platform may be configured to change a credential (e.g., a password) associated with the application after each use, where the credential may be referred to as a one-time password (OTP). That is, the software platform may determine that the user accessed the application with a stored credential, and update the credential at the application based on the access. Additionally, or alternatively, the software platform may be configured to update a credential based on identifying the credential in a separate database. For example, the software platform may identify that an application has been breached, and passwords or other information may have been revealed to another party. In response to the breach, the software platform may update credentials for the user to protect the user's information or identity. In some examples, the software platform may be configured to remove (e.g., delete, deactivate) old or unused accounts at applications. For example, the software platform may identify that the user has not accessed an application for a duration, and delete the unused account to protect the user's information or identity, for example, by protecting the user from future breaches.

In some examples, the software platform may be configured to update personal information based on input from the user. For example, the user may update contact information (e.g., a phone number or an email address) at the software platform, and the software platform may be configured to access applications and update the contact information for the user. Additionally, or alternatively, the software platform may be configured to update contact information associated with a recovery factor. For example, an account of the user at the application may be configured with multi-factor authentication (e.g., using text messaging or email), and the software platform may update the contact information associated with the recovery to keep the multi-factor authentication information up to date.

Aspects of the disclosure are initially described in the context of a distributed computing environment and a system for managing identifying information. Aspects of the disclosure are further illustrated by and described with reference to apparatus diagrams, system diagrams, and flowcharts that relate to techniques for credential and identity synchronization.

FIG. 1 illustrates an example of a system 100 for cloud computing that supports techniques for credential and identity synchronization in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transfer control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some cases, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other appropriate form of interaction. The interaction 130 may be a business-to-business (B2B) interaction or a business-to-consumer (B2C) interaction. An application 110 may also be referred to as a customer, a client, a website, or some other suitable terminology. In some cases, the application 110 may be an example of a server, a node, a compute cluster, or any other type of computing system, component, or environment. In some cases, the application 110 may be operated by a user or group of users.

Authentication platform 115 may offer cloud-based services to the client devices 105, the applications 110, or both. In some cases, authentication platform 115 may support database system such as a multi-tenant database system. In this case, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some cases, authentication platform 115 may receive data directly from an interaction 130 between an application 110 and the client device 105. In some cases, the client device 105 may develop applications to run on authentication platform 115. Authentication platform 115 may be implemented using remote servers. In some cases, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some cases, the data stored at data storage 120 may be backed up by copies of the data at multiple locations.

Subsystem 125 may include client devices 105, authentication platform 115, and data storage 120. In some cases, data processing may occur at any of the components of subsystem 125, or at a combination of these components. In some cases, servers may perform the data processing. The servers may be a client device 105 or located at data storage 120.

As described herein, a subsystem 125 (e.g., a software platform associated with a client device 105 or an authentication platform 115) may be configured to access an application 110 via an interaction 130 to update a credential based on an integration parameter associated with the application 110, which may correspond to how the subsystem 125 may access the application 110. For example, the subsystem 125 may receive (e.g., from a user, such as via a client device 105) a request to update the credential. The subsystem 125 may identify an association between the subsystem 125 and the application 110. For example, the subsystem 125 may have a CIAM relationship with the application 110, where the application 110 may allow the subsystem 125 (e.g., a SaaS platform associated with the data storage 120) to manage login verification or other authentication procedures for the application 110. Additionally, or alternatively, the application 110 may include an SDK or an API of the subsystem 125, which may provide access to a backend of the application 110 for managing the credential. Based on the association between the subsystem 125 and the application 110, the subsystem 125 may determine an integration parameter available to the subsystem 125 for communicating with the application 110. The subsystem 125 may access the application 110 based on the integration parameter, for example using authentication information stored at a component of the subsystem 125, and update the credential associated with the application 110. In some examples, the subsystem 125 may use respective integration parameters associated with a set of applications 110 to concurrently update credentials associated with the set of applications 110. For example, if a user has accounts across a relatively large quantity of applications 110, the subsystem 125 may enable the user to efficiently update credentials (e.g., passwords) at the applications 110, for example, without the user separately accessing each application 110.

In some examples, the subsystem 125 may enable additional security procedures at the application 110. For example, the subsystem 125 may be configured to change a credential (e.g., a password) associated with the application 110 after each interaction 130, where the credential may be referred to as an OTP. That is, a component of the subsystem 125 may determine that the user accessed the application 110 with a stored credential, and update the credential at the application 110 based on the access. Additionally, or alternatively, the subsystem 125 may be configured to update a credential based on identifying the credential in a separate database. For example, the subsystem 125 may identify that an application 110 has been breached, and passwords or other information may have been revealed to another party. In response to the breach, the subsystem 125 may update credentials for the user to protect the user's information or identity. In some examples, the subsystem 125 may be configured to remove (e.g., delete, deactivate) old or unused accounts at applications 110. For example, the subsystem 125 may identify that the user has not accessed an application 110 for a duration, and delete the unused account to protect the user's information or identity, for example, by protecting the user from future breaches.

In some examples, the subsystem 125 may be configured to update personal information based on input from the user. For example, the user may update contact information (e.g., a phone number or an email address) at the subsystem 125, and the subsystem 125 may be configured to access applications 110 and update the contact information for the user. Additionally, or alternatively, a component of the subsystem 125 may be configured to update contact information associated with a recovery factor. For example, an account of the user at the application 110 may be configured with multi-factor authentication (e.g., using text messaging or email), and a component of the subsystem 125 may update the contact information associated with the recovery to keep the multi-factor authentication information up to date.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
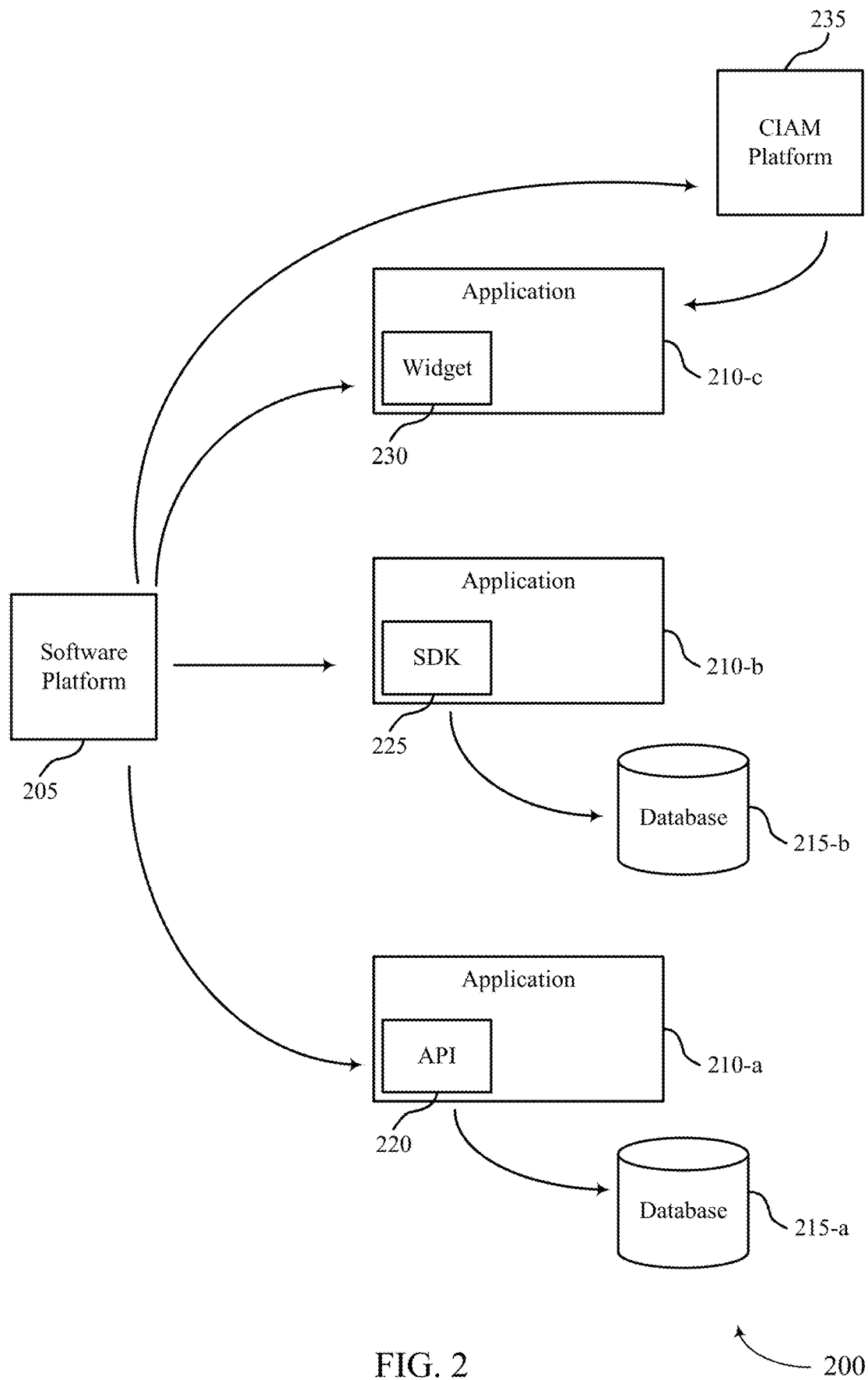
FIG. 2 illustrates an example of a system that supports techniques for credential and identity synchronization in accordance with aspects of the present disclosure.

FIG. 2 illustrates an example of a system 200 that supports techniques for credential and identity synchronization in accordance with aspects of the present disclosure. In some examples, the system 200 may include or implement aspects of the system 100. For example, the system 200 may include a software platform 205, which may be an example of one or more components of a subsystem 125 described with reference to FIG. 1. The software platform may be in communication with one or more applications 210, each of which may be implemented at an application 110 described with reference to FIG. 1.

The techniques described herein may enable a software platform 205 (e.g., a wallet) to access an application 210 to update a credential based on an integration parameter for the software platform 205, which may correspond to how the software platform 205 may access the application 210. For example, the software platform 205 may receive a request to update the credential. The software platform 205 may identify an association between the software platform 205 and the application 210. Based on the association between the software platform 205 and the application, the software platform 205 may determine an integration parameter available to the software platform 205 for communicating with the application 210. The software platform 205 may access the application 210 based on the integration parameter, for example using authentication information stored at the software platform 205, and update the credential associated with the application 210. In some examples, the credential may be stored at a database 215 associated with the application 210. The software platform 205 may access the database 215 based on the available integration parameter to update the stored credential.

In some examples, an integration parameter for an application 210-*a* may be based on an API 220. The API 220 may be associated with the software platform 205, the application 210-*a*, a third party, or any combination thereof. In some examples, the software platform 205 may access the API 220 via a plugin, such as a plugin installed at a web browser used to access the application 210-*a*. The API 220 may enable the software platform 205 to access a backend of the application 210-*a* and update the credential. For example, the credential may be stored at a database 215-*a* associated with the application 210-*a*. The software platform 205 may access the database 215-*a* via the API 220 and update the stored credential.

In some examples, an integration parameter for an application 210-*b* may be based on an SDK 225 included at the application 210-*b*. The SDK 225 may be associated with the software platform 205, where a vendor of the application 210-*b* may include the SDK 225 in the application 210-*b* based on an agreement with a vendor of the software platform 205. The SDK 225 may enable the software platform 205 to access a backend of the application 210-*b* and update the credential. For example, the credential may be stored at a database 215-*b* associated with the application 210-*b*. The software platform 205 may access the database 215-*b* via the SDK 225 and update the stored credential.

In some examples, the software platform 205 may have a CIAM relationship with an application 210-*c*, where the application 210-*c* may allow the vendor of the software platform 205 to manage login verification or other authentication procedures for the application 210-*c*, for example, using a CIAM platform 235. In some examples, the software platform 205 may identify the CIAM relationship with the application 210-*c* based on a widget 230 included at the application 210-*c*. Based on the CIAM relationship, the software platform 205 may access the application 210-*c* via the CIAM platform 235 to update the credential.

In some examples, the software platform 205 may use respective integration parameters associated with a set of applications 210 to concurrently update credentials associated with the set of applications 210. For example, if a user has accounts across a relatively large quantity of applications 210, the software platform 205 may enable the user to efficiently update credentials (e.g., passwords) at the applications 210, for example, without the user separately accessing each application 210.

In some examples, the software platform 205 may enable additional security procedures at the application 210. For example, the software platform 205 may be configured to change a credential (e.g., a password, which may be an OTP) associated with the application 210 after each us. That is, the software platform 205 may determine that the user accessed the application 210 with a stored credential, and update the credential at the application 210 based on the access. Additionally, or alternatively, the software platform 205 may be configured to update a credential based on identifying the credential in a separate database. For example, the software platform 205 may identify that an application 210 has been breached, and passwords or other information may have been revealed to another party. In response to the breach, the software platform 205 may update credentials for the user to protect the user's information or identity. In some examples, the software platform 205 may be configured to remove (e.g., delete, deactivate) old or unused accounts at applications 210. For example, the software platform 205 may identify that the user has not accessed an application 210 for a duration, and delete the unused account to protect the user's information or identity, for example, by protecting the user from future breaches.

In some examples, the software platform 205 may be configured to update personal information based on input from the user. For example, the user may update contact information (e.g., a phone number or an email address) at the software platform 205, and the software platform 205 may be configured to access applications 210 and update the contact information for the user. Additionally, or alternatively, the software platform 205 may be configured to update contact information associated with a recovery factor. For example, an account of the user at the application 210 may be configured with multi-factor authentication (e.g., using text messaging or email), and the software platform 205 may update the contact information associated with the recovery to keep the multi-factor authentication information up to date.

Figure 3:
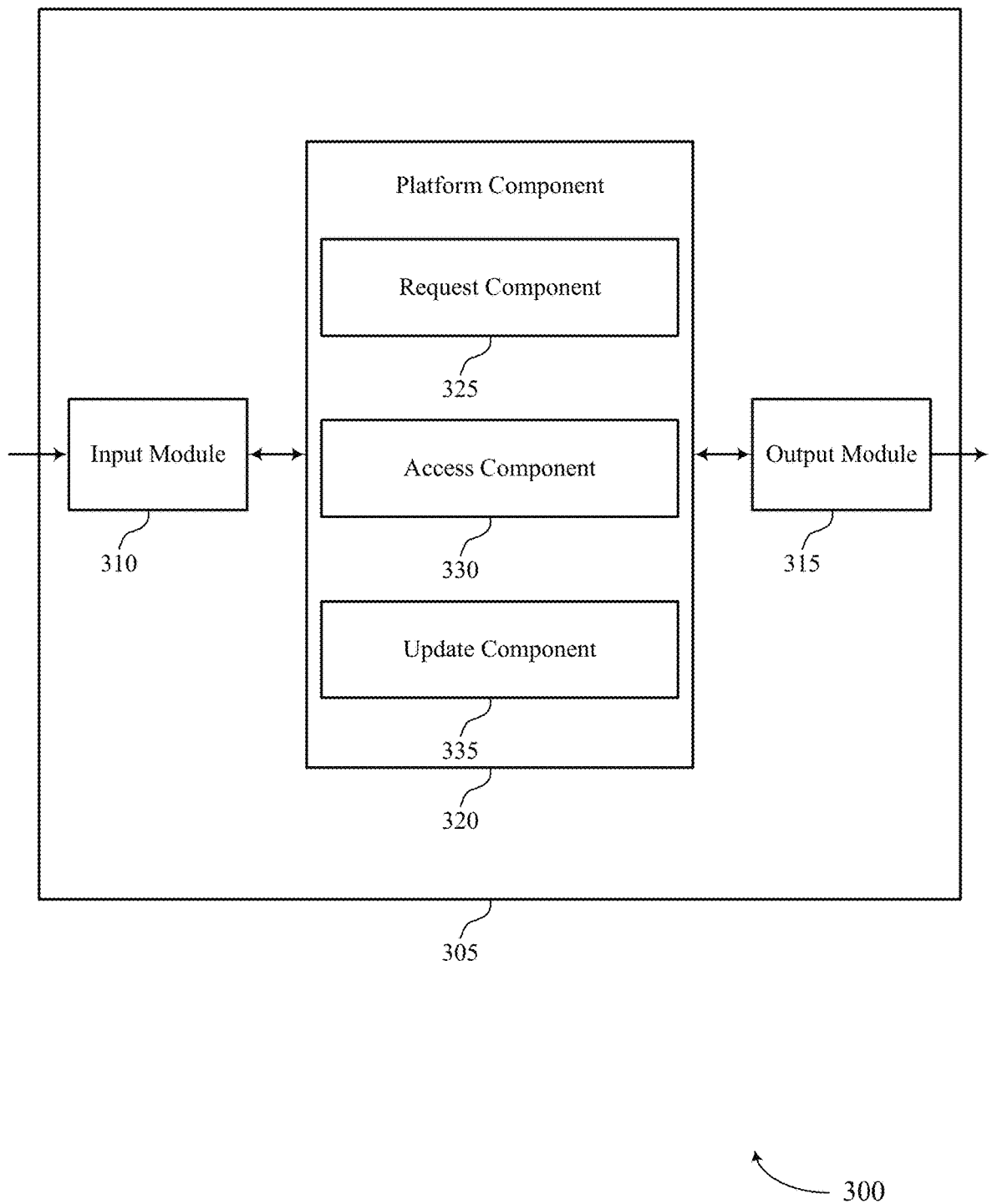
FIG. 3 shows a block diagram of an apparatus that supports techniques for credential and identity synchronization in accordance with aspects of the present disclosure.

FIG. 3 shows a block diagram 300 of a device 305 that supports techniques for credential and identity synchronization in accordance with aspects of the present disclosure. The device 305 may include an input module 310, an output module 315, and a platform component 320. The device 305 may also include a processor. Each of these components may be in communication with one another (e.g., via one or more buses).

The input module 310 may manage input signals for the device 305. For example, the input module 310 may identify input signals based on an interaction with a modem, a keyboard, a mouse, a touchscreen, or a similar device. These input signals may be associated with user input or processing at other components or devices. In some cases, the input module 310 may utilize an operating system such as iOS®, ANDROID®, MS-DOS®, MS-WINDOWS®, OS/2®, UNIX®, LINUX®, or another known operating system to handle input signals. The input module 310 may send aspects of these input signals to other components of the device 305 for processing. For example, the input module 310 may transmit input signals to the platform component 320 to support techniques for credential and identity synchronization. In some cases, the input module 310 may be a component of an I/O controller 510 as described with reference to FIG. 5.

The output module 315 may manage output signals for the device 305. For example, the output module 315 may receive signals from other components of the device 305, such as the platform component 320, and may transmit these signals to other components or devices. In some examples, the output module 315 may transmit output signals for display in a user interface, for storage in a database or data store, for further processing at a server or server cluster, or for any other processes at any number of devices or systems. In some cases, the output module 315 may be a component of an I/O controller 510 as described with reference to FIG. 5.

For example, the platform component 320 may include a request component 325, an access component 330, an update component 335, or any combination thereof. In some examples, the platform component 320, or various components thereof, may be configured to perform various operations (e.g., receiving, monitoring, transmitting) using or otherwise in cooperation with the input module 310, the output module 315, or both. For example, the platform component 320 may receive information from the input module 310, send information to the output module 315, or be integrated in combination with the input module 310, the output module 315, or both to receive information, transmit information, or perform various other operations as described herein.

The platform component 320 may support managing identifying information in accordance with examples as disclosed herein. The request component 325 may be configured as or otherwise support a means for receiving, at a software platform, a request to update a credential associated with an application. The access component 330 may be configured as or otherwise support a means for determining an integration parameter for the application based on an association between the software platform and the application. The access component 330 may be configured as or otherwise support a means for accessing the application via the software platform based on the determined integration parameter and authentication information stored at the software platform. The update component 335 may be configured as or otherwise support a means for updating the credential based on accessing the application.

Figure 4:
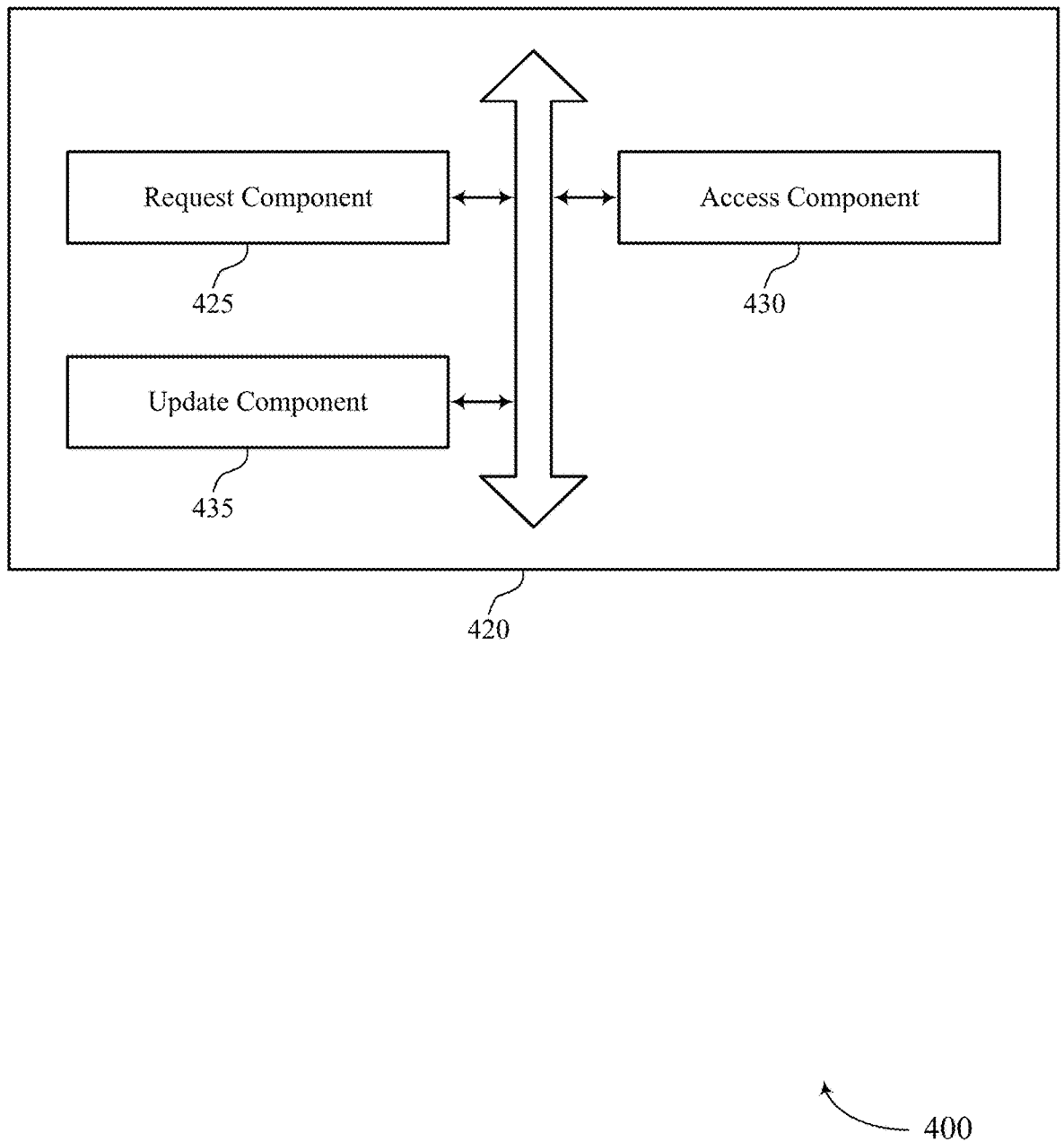
FIG. 4 shows a block diagram of a platform component that supports techniques for credential and identity synchronization in accordance with aspects of the present disclosure.

FIG. 4 shows a block diagram 400 of a platform component 420 that supports techniques for credential and identity synchronization in accordance with aspects of the present disclosure. The platform component 420 may be an example of aspects of a platform component or a platform component 320, or both, as described herein. The platform component 420, or various components thereof, may be an example of means for performing various aspects of techniques for credential and identity synchronization as described herein. For example, the platform component 420 may include a request component 425, an access component 430, an update component 435, or any combination thereof. Each of these components may communicate, directly or indirectly, with one another (e.g., via one or more buses).

The platform component 420 may support managing identifying information in accordance with examples as disclosed herein. The request component 425 may be configured as or otherwise support a means for receiving, at a software platform, a request to update a credential associated with an application. The access component 430 may be configured as or otherwise support a means for determining an integration parameter for the application based on an association between the software platform and the application. In some examples, the access component 430 may be configured as or otherwise support a means for accessing the application via the software platform based on the determined integration parameter and authentication information stored at the software platform. The update component 435 may be configured as or otherwise support a means for updating the credential based on accessing the application.

In some examples, the access component 430 may be configured as or otherwise support a means for identifying a prior access of the application, where the request to update the credential is received based on identifying the prior access.

In some examples, the request component 425 may be configured as or otherwise support a means for identifying the credential in a database, where the request to update the credential is received based on identifying the credential in the database.

In some examples, to support updating the credential, the update component 435 may be configured as or otherwise support a means for deactivating an account at the application, the account associated with a user of the software platform.

In some examples, the account is deactivated based on a duration since a prior access of the application.

In some examples, the credential includes personal information associated with a user of the software platform, a password associated with accessing the application, an authentication factor associated with accessing the application, or any combination thereof.

In some examples, the association between the software platform and the application is based on an SDK of the software platform that is included with the application. In some examples, the integration parameter is determined based on identifying the SDK.

In some examples, the association between the software platform and the application is based on an API of the software platform that is configured to communicate with the application. In some examples, the integration parameter is determined based on identifying the API.

In some examples, the association between the software platform and the application is based on a plugin of the software platform that is configured to communicate with the application. In some examples, the integration parameter is determined based on identifying the plugin.

In some examples, the association between the software platform and the application is based on a CIAM relationship between the software platform and the application. In some examples, the integration parameter is determined based on identifying the CIAM relationship.

Figure 5:
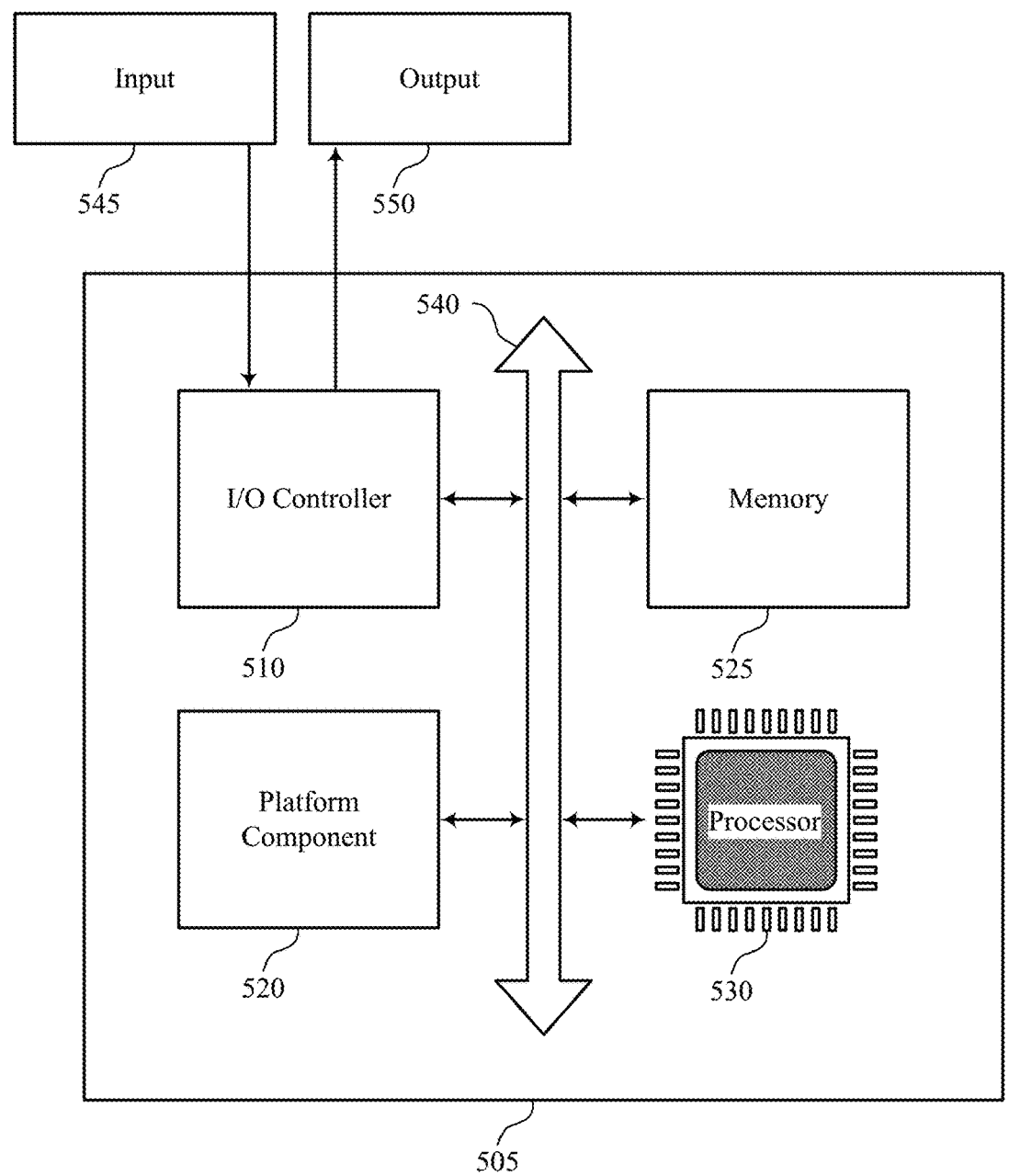
FIG. 5 shows a diagram of a system including a device that supports techniques for credential and identity synchronization in accordance with aspects of the present disclosure.

FIG. 5 shows a diagram of a system 500 including a device 505 that supports techniques for credential and identity synchronization in accordance with aspects of the present disclosure. The device 505 may be an example of or include the components of a device 305 as described herein. The device 505 may include components for bi-directional data communications including components for transmitting and receiving communications, such as a platform component 520, an input/output (I/O) controller 510, a memory 525, and a processor 530. These components may be in electronic communication or otherwise coupled (e.g., operatively, communicatively, functionally, electronically, electrically) via one or more buses (e.g., a bus 540).

The I/O controller 510 may manage input signals 545 and output signals 550 for the device 505. The I/O controller 510 may also manage peripherals not integrated into the device 505. In some cases, the I/O controller 510 may represent a physical connection or port to an external peripheral. In some cases, the I/O controller 510 may utilize an operating system such as iOS®, ANDROID®, MS-DOS®, MS-WINDOWS®, OS/2®, UNIX®, LINUX®, or another known operating system. In other cases, the I/O controller 510 may represent or interact with a modem, a keyboard, a mouse, a touchscreen, or a similar device. In some cases, the I/O controller 510 may be implemented as part of a processor 530. In some examples, a user may interact with the device 505 via the I/O controller 510 or via hardware components controlled by the I/O controller 510.

Memory 525 may include random-access memory (RAM) and read-only memory (ROM). The memory 525 may store computer-readable, computer-executable software including instructions that, when executed, cause the processor 530 to perform various functions described herein. In some cases, the memory 525 may contain, among other things, a basic I/O system (BIOS) which may control basic hardware or software operation such as the interaction with peripheral components or devices. In some examples, the memory 525 may include a database configured for managing identifying information. The database may be an example of a single database, a distributed database, multiple distributed databases, a data store, a data lake, or an emergency backup database.

The processor 530 may include an intelligent hardware device, such as a general-purpose processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some cases, the processor 530 may be configured to operate a memory array using a memory controller. In other cases, a memory controller may be integrated into the processor 530. The memory controller may manage data storage and processing in a memory 525. The processor 530 may be configured to execute computer-readable instructions stored in a memory 525 to perform various functions (e.g., functions or tasks supporting techniques for credential and identity synchronization).

The platform component 520 may support managing identifying information in accordance with examples as disclosed herein. For example, the platform component 520 may be configured as or otherwise support a means for receiving, at a software platform, a request to update a credential associated with an application. The platform component 520 may be configured as or otherwise support a means for determining an integration parameter for the application based on an association between the software platform and the application. The platform component 520 may be configured as or otherwise support a means for accessing the application via the software platform based on the determined integration parameter and authentication information stored at the software platform. The platform component 520 may be configured as or otherwise support a means for updating the credential based on accessing the application.

By including or configuring the platform component 520 in accordance with examples as described herein, the device 505 may support techniques for improved user experience managing identity information, improved coordination between devices, and increased security and protection for a user of the device 505.

Figure 6:
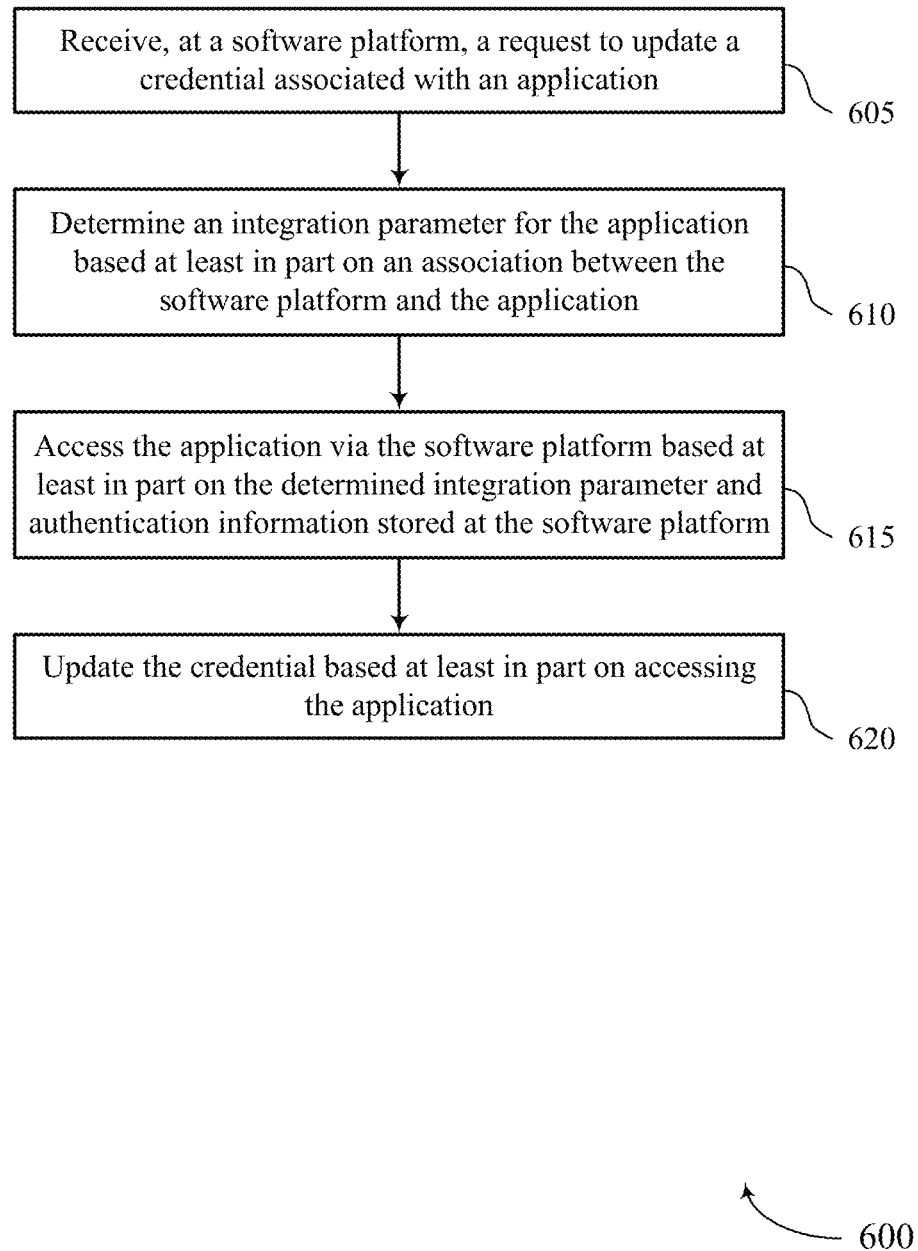
FIG. 6 shows a flowchart illustrating methods that support techniques for credential and identity synchronization in accordance with aspects of the present disclosure.

FIG. 6 shows a flowchart illustrating a method 600 that supports techniques for credential and identity synchronization in accordance with aspects of the present disclosure. The operations of the method 600 may be implemented by a device (or its components) that includes a software platform as described herein. For example, the operations of the method 600 may be performed by a client device as described with reference to FIGS. 1 through 5. In some examples, a client device may execute a set of instructions to control the functional elements of the client device to perform the described functions. Additionally, or alternatively, the client device may perform aspects of the described functions using special-purpose hardware.

At 605, the method may include receiving, at a software platform, a request to update a credential associated with an application. The operations of 605 may be performed in accordance with examples as disclosed herein. In some examples, aspects of the operations of 605 may be performed by a request component 425 as described with reference to FIG. 4.

At 610, the method may include determining an integration parameter for the application based on an association between the software platform and the application. The operations of 610 may be performed in accordance with examples as disclosed herein. In some examples, aspects of the operations of 610 may be performed by an access component 430 as described with reference to FIG. 4.

At 615, the method may include accessing the application via the software platform based on the determined integration parameter and authentication information stored at the software platform. The operations of 615 may be performed in accordance with examples as disclosed herein. In some examples, aspects of the operations of 615 may be performed by an access component 430 as described with reference to FIG. 4.

At 620, the method may include updating the credential based on accessing the application. The operations of 620 may be performed in accordance with examples as disclosed herein. In some examples, aspects of the operations of 620 may be performed by an update component 435 as described with reference to FIG. 4.

A method for managing identifying information is described. The method may include receiving, at a software platform, a request to update a credential associated with an application, determining an integration parameter for the application based on an association between the software platform and the application, accessing the application via the software platform based on the determined integration parameter and authentication information stored at the software platform, and updating the credential based on accessing the application.

An apparatus for managing identifying information is described. The apparatus may include a processor, memory coupled with the processor, and instructions stored in the memory. The instructions may be executable by the processor to cause the apparatus to receive, at a software platform, a request to update a credential associated with an application, determine an integration parameter for the application based on an association between the software platform and the application, access the application via the software platform based on the determined integration parameter and authentication information stored at the software platform, and update the credential based on accessing the application.

Another apparatus for managing identifying information is described. The apparatus may include means for receiving, at a software platform, a request to update a credential associated with an application, means for determining an integration parameter for the application based on an association between the software platform and the application, means for accessing the application via the software platform based on the determined integration parameter and authentication information stored at the software platform, and means for updating the credential based on accessing the application.

A non-transitory computer-readable medium storing code for managing identifying information is described. The code may include instructions executable by a processor to receive, at a software platform, a request to update a credential associated with an application, determine an integration parameter for the application based on an association between the software platform and the application, access the application via the software platform based on the determined integration parameter and authentication information stored at the software platform, and update the credential based on accessing the application.

Some examples of the method, apparatuses, and non-transitory computer-readable medium described herein may further include operations, features, means, or instructions for identifying a prior access of the application, where the request to update the credential may be received based on identifying the prior access.

Some examples of the method, apparatuses, and non-transitory computer-readable medium described herein may further include operations, features, means, or instructions for identifying the credential in a database, where the request to update the credential may be received based on identifying the credential in the database.

In some examples of the method, apparatuses, and non-transitory computer-readable medium described herein, updating the credential may include operations, features, means, or instructions for deactivating an account at the application, the account associated with a user of the software platform.

In some examples of the method, apparatuses, and non-transitory computer-readable medium described herein, the account may be deactivated based on a duration since a prior access of the application.

In some examples of the method, apparatuses, and non-transitory computer-readable medium described herein, the credential includes personal information associated with a user of the software platform, a password associated with accessing the application, an authentication factor associated with accessing the application, or any combination thereof.

In some examples of the method, apparatuses, and non-transitory computer-readable medium described herein, the association between the software platform and the application may be based on an SDK of the software platform that may be included with the application and the integration parameter may be determined based on identifying the SDK.

In some examples of the method, apparatuses, and non-transitory computer-readable medium described herein, the association between the software platform and the application may be based on an API of the software platform that may be configured to communicate with the application and the integration parameter may be determined based on identifying the API.

In some examples of the method, apparatuses, and non-transitory computer-readable medium described herein, the association between the software platform and the application may be based on a plugin of the software platform that may be configured to communicate with the application and the integration parameter may be determined based on identifying the plugin.

In some examples of the method, apparatuses, and non-transitory computer-readable medium described herein, the association between the software platform and the application may be based on a CIAM relationship between the software platform and the application and the integration parameter may be determined based on identifying the CIAM relationship.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing identifying information, comprising:
receiving, at a software platform, a request to update a credential associated with an application, wherein:
the software platform comprises a plurality of associations with a plurality of applications including the application, and
the plurality of associations correspond to a plurality of access types by which the software platform accesses respective applications of the plurality of applications;
determining an integration parameter for the software platform to communicate with the application based at least in part on an association of the plurality of associations between the software platform and the application, wherein the integration parameter indicates instructions to access the application in accordance with an access type of the plurality of access types corresponding to the association between the software platform and the application;
accessing the application via the software platform based at least in part on the instructions indicated by the determined integration parameter and authentication information stored at the software platform; and
updating the credential based at least in part on accessing the application.

2. The method of claim 1, further comprising:
identifying a prior access of the application, wherein the request to update the credential is received based at least in part on identifying the prior access.

3. The method of claim 1, further comprising:
identifying the credential in a database, wherein the request to update the credential is received based at least in part on identifying the credential in the database.

4. The method of claim 1, wherein updating the credential comprises:
deactivating an account at the application, the account associated with a user of the software platform.

5. The method of claim 4, wherein the account is deactivated based at least in part on a duration since a prior access of the application.

6. The method of claim 1, wherein the credential comprises personal information associated with a user of the software platform, a password associated with accessing the application, an authentication factor associated with accessing the application, or any combination thereof.

7. The method of claim 1, wherein:
the association between the software platform and the application is based at least in part on a software development kit (SDK) of the software platform that is included with the application; and
the integration parameter is determined based at least in part on identifying the SDK, wherein inclusion of the SDK with the application is indicative of the access type.

8. The method of claim 1, wherein:
the association between the software platform and the application is based at least in part on an application programming interface (API) of the software platform that is configured to communicate with the application; and
the integration parameter is determined based at least in part on identifying the API, wherein configuration of the API is indicative of the access type.

9. The method of claim 1, wherein:
the association between the software platform and the application is based at least in part on a plugin of the software platform that is configured to communicate with the application; and
the integration parameter is determined based at least in part on identifying the plugin, wherein configuration of the plugin is indicative of the access type.

10. The method of claim 1, wherein:
the association between the software platform and the application is based at least in part on a customer identity and access management (CIAM) relationship between the software platform and the application; and
the integration parameter is determined based at least in part on identifying the CIAM relationship, wherein the CIAM relationship is indicative of the access type.

11. An apparatus for managing identifying information, comprising:
a processor;
memory coupled with the processor; and
instructions stored in the memory and executable by the processor to cause the apparatus to:
receive, at a software platform, a request to update a credential associated with an application, wherein:
the software platform comprises a plurality of associations with a plurality of applications including the application, and
the plurality of associations correspond to a plurality of access types by which the software platform accesses respective applications of the plurality of applications;
determine an integration parameter for the software platform to communicate with the application based at least in part on an association of the plurality of associations between the software platform and the application, wherein the integration parameter indicates instructions to access the application in accordance with an access type of the plurality of access types corresponding to the association between the software platform and the application;
access the application via the software platform based at least in part on the instructions indicated by the determined integration parameter and authentication information stored at the software platform; and
update the credential based at least in part on accessing the application.

12. The apparatus of claim 11, wherein the instructions are further executable by the processor to cause the apparatus to:
identify a prior access of the application, wherein the request to update the credential is received based at least in part on identifying the prior access.

13. The apparatus of claim 11, wherein the instructions are further executable by the processor to cause the apparatus to:
identify the credential in a database, wherein the request to update the credential is received based at least in part on identifying the credential in the database.

14. The apparatus of claim 11, wherein the instructions to update the credential are executable by the processor to cause the apparatus to:
deactivate an account at the application, the account associated with a user of the software platform.

15. The apparatus of claim 14, wherein the account is deactivated based at least in part on a duration since a prior access of the application.

16. The apparatus of claim 11, wherein the credential comprises personal information associated with a user of the software platform, a password associated with accessing the application, an authentication factor associated with accessing the application, or any combination thereof.

17. A non-transitory computer-readable medium storing code for managing identifying information, the code comprising instructions executable by a processor to:
receive, at a software platform, a request to update a credential associated with an application, wherein:
the software platform comprises a plurality of associations with a plurality of applications including the application, and
the plurality of associations correspond to a plurality of access types by which the software platform accesses respective applications of the plurality of applications;
determine an integration parameter for the software platform to communicate with the application based at least in part on an association of the plurality of associations between the software platform and the application, wherein the integration parameter indicates instructions to access the application in accordance with an access type of the plurality of access types corresponding to the association between the software platform and the application;

access the application via the software platform based at least in part on the instructions indicated by the determined integration parameter and authentication information stored at the software platform; and update the credential based at least in part on accessing the application.

18. The non-transitory computer-readable medium of claim 17, wherein the instructions are further executable by the processor to:

identify a prior access of the application, wherein the request to update the credential is received based at least in part on identifying the prior access.

19. The non-transitory computer-readable medium of claim 17, wherein the instructions are further executable by the processor to:

identify the credential in a database, wherein the request to update the credential is received based at least in part on identifying the credential in the database.

20. The non-transitory computer-readable medium of claim 17, wherein the instructions to update the credential are executable by the processor to:

deactivate an account at the application, the account associated with a user of the software platform.

\* \* \* \* \*